INVENTORS
TETSUO TOKITA
MINORU MORIO
RYOZO ASANO

BY [signature]
ATTORNEY

INVENTORS
TETSUO TOKITA
MINORU MORIO
RYOZO ASANO
BY [signature]
ATTORNEY

United States Patent Office 3,452,240

Patented June 24, 1969

3,452,240

SAFELY ADJUSTABLE CONVERGENCE DEFLECTION CIRCUIT FOR A SINGLE-GUN, PLURAL-BEAM TYPE COLOR PICTURE TUBE

Tetsuo Tokita, Minoru Morio, and Ryozo Asano, Tokyo, Japan, assignors to Sony Corporation, Tokyo, Japan, a corporation of Japan Filed June 24, 1968, Ser. No. 739,383

Claims priority, application Japan, June 22, 1967, 42/39,602

Int. Cl. H01j *29/50, 31/04*

U.S. Cl. 315—13 11 Claims

ABSTRACT OF THE DISCLOSURE

A circuit is disclosed for energizing a single gun, plural beam type color picture tube. The circuit provides a high, in fact a dangerously high, anode voltage. This anode voltage is applied to one of each pair of the convergence deflection electrodes which are required to converge the beams representing different color signals, so that they form a common color picture element. The circuit further provides a voltage to the other electrode of each pair which differs from the anode voltage by a convergence deflection voltage, so as to produce the desired convergence effect. This convergence deflection voltage is adjustable for optimum convergence, but in order to make the adjustment operation safe, the adjusting element, which may be a series or shunt impedance or a switchable set of taps, is isolated from the anode voltage by an isolating transformer.

*Field of the invention*

This invention relates generally to color television circuitry and, more particularly, to an adjusting circuit for the convergence voltage source used in color picture tube systems of the single-gun, plural-beam type.

*The prior art*

Single-gun, plural beam type color picture tube systems are known. In this type of tube the plural electron beams are focussed to converge at a common spot corresponding to a picture element on the color phosphor screen. In a known system utilizing three electron beams, the latter are emitted by suitable beam generating means and are passed through the optical center of a common main focussing lens of the electron gun. One of the beams emerges from such lens along the optical axis and the other beams diverge therefrom in opposite directions. Subsequently, the beams are passed through convergence means located between the electron gun and the color screen. There the two divergent beams are deflected to converge with the one central beam at a common spot in a screen grid, which corresponds to a color picture tube element. Then the beams diverge therefrom to strike the color picture tube element itself. In such systems, the three electron beams will be substantially free from the influence of coma and astimatism of the main lens, since the beams pass through the optical center of the lens. Accordingly, "glowing" of the beam spots on the color phosphor screen is substantially prevented.

In such color picture tube systems it is, however, desirable to provide for adjustment of the static convergence voltage and/or the dynamic horizontal convergence voltage in order to insure proper electron beam convergence so that the resulting color picture is substantially free from misconvergence. However, since very high voltages, at or near the anode voltage, are imparted to the electron beam convergence means in order to match the high voltages used for focussing, and thereby prevent the electric field from being unnecessarily disturbed in the vicinity of the converging means, a dangerous condition occurs if the adjustment of the static and dynamic convergence voltages is performed at a circuit point where a high voltage is applied.

*Summary and objects of the invention*

Accordingly, it is an object of this invention to provide a safe electron beam convergence voltage adjustment circuit for use in color picture tube systems of the type which apply to the electron beam convergence means high voltages differing from each other by at least a static convergence voltage, and preferably by both static and horizontal dynamic convergence voltages.

Another object of this invention is to provide an electron convergence voltage generating circuit of simplified construction which also provides the anode voltage and is arranged in such a manner as to permit adjustment of the static and/or dynamic convergence voltages without danger, thereby insuring proper convergence.

Still another object of this invention is the provision of safely adjustable electron beam convergence voltage generating circuitry which is cooperatively associated with the anode voltage generating means in such manner that variations in the anode voltage applied to the color picture tube will have substantially no effect upon electron beam convergence.

These objectives are accomplished by providing an improved circuit for energizing a color picture tube of the single gun, plural beam type. The circuit includes means for providing a high voltage which is connected to one of the convergence deflection electrodes of such a tube, plus a circuit having an output which superimposes the convergence deflection voltage upon the high voltage and connects it to another one of the convergence deflection electrodes, and a source for energizing the convergence deflection voltage circuit. Specifically, the present improvement resides in a means connected between the source and the output end of the convergence deflection voltage circuit which provides isolation from the high potential, and adjustable means connected between the source and the isolating means to permit safe manual adjustment of the convergence deflection voltage.

The above, and other objects, features and advantages of this invention will be apparent in the following detailed description of illustrative embodiments thereof which is to be read in conjunction with the accompanying drawings, wherein:

FIG. 2A is a waveform showing the pulse-like voltage occurring in the electron beam convergence voltage generating means of FIG. 1;

FIG. 2B is a waveform showing the static and dynamic convergence voltages provided by the electron beam convergence voltage generating means of FIG. 1.

Figures 1, 2:
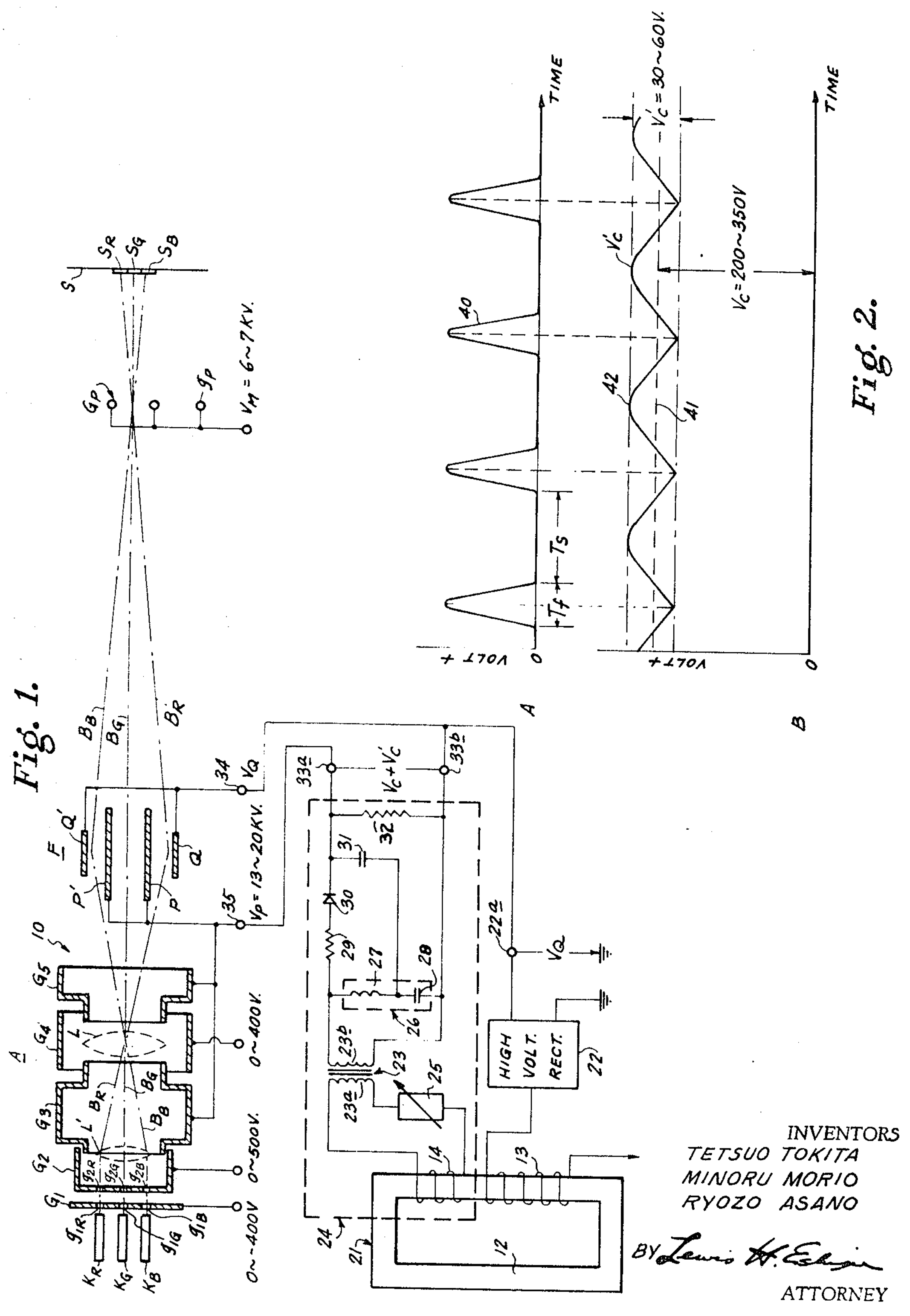
FIG. 1 is a schematic circuit diagram of a color picture tube of the single-gun, plural-beam type, and electron beam convergence voltage generation means constructed in accordance with a first embodiment of this invention.

Referring to the drawings in detail, and initially to FIG. 1, it will be seen that a single-gun, plural-beam type color picture tube is indicated generally at 10, and comprises an electron gun A having cathodes $K_R$, $K_G$ and $K_B$, each of which includes a beam-generating source with the respective beam-generating surfaces thereof disposed as shown in a plane which is substantially perpendicular to the axis of the electron gun A. A first grid $G_1$ is spaced from the respective cathodes $K_R$, $K_G$, and $K_B$ and includes apertures $g_{1R}$, $g_{1G}$ and $g_{1B}$ formed therein as shown, in alignment with the respective cathode beam-generating surfaces. A common grid $G_2$ is spaced from the first grid $G_1$ and similarly includes apertures $g_{2R}$, $g_{2G}$ and $g_{2B}$ formed therein, in alignment with the respective apertures of the first grid $G_1$. Successively arranged as shown in the direction going away from the common grid $G_2$ are open-ended, tubular grids or electrodes $G_3$, $G_4$ and $G_5$ respectively, with the respective cathodes $K_R$, $K_G$ and $K_B$, the grids $G_1$ and $G_2$, and the electrodes $G_3$, $G_4$ and $G_5$ being maintained in the illustrated assembled positions thereof by suitable conventional support means (not shown) formed of an insulating material.

For operation of the electron gun A of FIG. 1, appropriate voltages are applied to the grids $G_1$ and $G_2$ and to the electrodes $G_3$, $G_4$ and $G_5$. Thus, for example, a voltage of 0 to minus 400 v. is applied to the grid $G_1$, a voltage of 0 to 500 v. is applied to the grid $G_2$, a voltage of 13 to 20 kv. is applied to the electrodes $G_3$ and $G_5$, and a voltage of 0 to 400 v. is applied to the electrode $G_4$, all of these voltages being based upon the cathode voltage as a zero reference. As a result, the voltage distributions between the respective electrodes and cathodes, and the respective lengths and diameters thereof, will be substantially identical with those of a unipotential single-beam type electron gun comprising a single cathode and a pair of single-apertured grids.

With the applied voltage distribution as described, an electron lens field will be established between grid $G_2$ and the electrode $G_3$ to form an auxiliary lens L′ as indicated in dashed lines, and an electron lens field will be established around the axis of electrode $G_4$, by the electrodes $G_3$, $G_4$ and $G_5$, to form a main focussing lens L, again as indicated in dashed lines. For a typical use of the electron gun A, bias voltages of 100 v., 0 v., 300 v., 20 kv., 200 v. and 20 v. would be applied respectively to the cathodes $K_R$, $K_G$ and $K_B$, the first and second grids $G_1$ and $G_2$ the electrodes $G_3$, $G_4$ and $G_5$.

Also included in the electron gun A of FIG. 1 are electron beam convergence means F which comprise shielding plates P and P′ disposed in the illustrated spaced, opposed relationship, and axially extending deflector plates Q and Q′ which are disposed as shown in spaced, opposed relationship with the outer surfaces of the shielding plates P and P′. Although shown as substantially straight, the deflector plates Q and Q′ may, alternatively, be somewhat curved out, as is well known in the art.

The shielding plates P and P′ and the deflector plates Q and Q′ are respectively charged as hereinafter described and disposed so that the center electron beam $B_G$ will pass substantially undeflected between the shielding plates P and P′, while the two diverging electron beams $B_B$ and $B_R$ will be convergently deflected as shown by the respective passages thereof between the plates P′ and Q′, and P and Q. More specifically, a voltage $V_P$, which is equal to the voltage applied to the electrodes $G_3$ and $G_5$, is applied to the shielding plates P and P′, and a voltage $V_Q$, which is some 200 to 350 v. lower than the voltage $V_P$, is applied to the respective deflector plates Q and Q′. This latter differential of 200 to 350 v. is referred to as the convergence deflection voltage. The described arrangement results in the respective shieldplates P and P′ being at the same potential so that the center beam $B_G$ is undeflected. But the application of a convergence deflecting voltage or potential difference between each pair of plates P′Q′ and PQ imparts the requisite convergent deflection to the outer electron beams $B_B$ and $B_R$.

In operation, the respective electron beams $B_R$, $B_G$ and $B_B$ which emanate from the beam generating surfaces of the cathodes $K_R$, $K_G$ and $K_B$ pass through the respective grid apertures $g_{1R}$, $g_{1G}$ and $g_{1B}$, there to be intensity-modulated with what may be termed the "red," "green" and "blue" intensity signals applied between the cathodes and the first grid $G_1$. The respective electron beams then pass through the common auxiliary lens L′ to cross each other at the center of the main lens L. Thereafter, the center electron beam $B_G$ will pass substantially undeflected between the shielding plates P and P′ since they are both at the same potential. Passage of the electron beam $B_B$ between the plates P′ and Q′ and of the electron beam $B_R$ between the plates P and Q will, however, result in convergent deflection thereof as a result of the voltage applied therebetween. The system of FIG. 1 is so arranged that the electron beams $B_R$, $B_G$ and $B_B$ will subsequently converge or cross each other at a common spot between adjacent grid wires $g_P$ of the beam landing position determining mask $G_P$, and will then diverge therefrom to strike the color phosphor screen S. More specifically, it may be noted that the color phosphor screen S is composed of a large plurality of sets of vertically extending "red," "green" and "blue" phosphor stripes $S_R$, $S_G$ and $S_B$ with each of the said phosphor stripe sets forming a color picture element of a single-gun, plural beam type color picture tube. Thus it may be understood that the common spot formed by the beam convergence will correspond to one of these color picture elements.

The high voltage $V_P$ applied to electrodes $G_3$ and $G_5$ is also applied to the screen S as an anode voltage in the conventional manner through a graphite layer which is provided on the inner surface of the cathode ray tube cone (not shown). The mask $G_P$ comprises one wire $g_p$ for each phosphor stripe set on the screen S, and a post-focussing voltage $V_M$ ranging, for example, from 6 to 7 kv. is applied as indicated to the mask. Thus, to summarize the operation of the color picture tube of FIG. 1, the respective electron beams $B_B$, $B_G$ and $B_R$ coverage at the screen grid $G_P$ and then diverge therefrom in such manner that the electron beam $B_B$ will strike the "blue" phosphor stripe $S_B$, the electron beam $B_G$ will strike the "green" phosphor stripe $S_G$ and the electron beam $B_R$ will strike the "red" phosphor stripe $S_R$. Horizontal and vertical beam deflecting means (not shown) are, of course provided to effect electron beam scanning of the face of the color phosphor screen in the conventional manner, to form a color picture thereon. With this arrangement, the respective electron beams are each passed through the center of the main lens L of the electron gun A, as a result of which the respective beam spots formed by the electron beam impingements on the color phosphor screen S will be substantially free from the effects of coma and astifimatism of the main lens, so that improved color picture resolution will be provided.

A convergence deflecting voltage generating circuit constructed in accordance with a first embodiment of this invention is indicated generally at 24 and is connected as indicated to the electron gun means A to provide the requisite voltages to plates P and P′ and to plates Q and Q′. The convergence voltage generating circuit is also connected to a fly-back transformer, generally indicated at 21, which is in turn connected to a conventional horizontal deflection voltage output circuit (not shown). The fly-back transformer 21 (the primary winding of which is not shown) comprises a closed magnetic core 12 and a high voltage secondary winding 13. Also wound on the magnetic core 12 is a convergence deflecting voltage secondary winding 14 which is part of the convergence voltage deflecting generating circuit 24. In addition, the circuit 24 comprises an isolating transformer 23 including a primary winding **23*a* and a secondary winding 23*b*. The primary winding 23*a* is connected to the winding 14 through a convergence adjusting circuit 25 which may comprise a variable impedence element such as a variable resistor, variable inductance, or the like. Series-connected diode 30 and resistors 29 and 32 are connected as indicated across the secondary winding 23*b* of transformer 23, with the diode 30 being connected in what will later be understood to be the forward direction. In addition, series-connected capacitors 31 and 28 are connected in parallel with the resistor 32, and an inductor 27 is connected as shown between the junction of the secondary winding 23*b* and resistor 29, and the connection point of the respective capacitors 31 and 28. Circuit terminals 33*a* and 33*b* are connected across the resistor 32**.

In operation, a pulse voltage of the horizontal deflection frequency is induced across the winding 14, and imparted to the transformer 23 through the adjusting circuit 25. Thus, pulses of the horizontal deflection frequency, such as indicated at 40 in FIG. 2A, occur at the secondary winding **23*b* of the transformer 23. The pulses 40 developed in the winding 23*b* are rectified by the rectifier circuit formed by the diode 30, resistors 29 and 32, and capacitors 31 and 28, to provide a static convergence deflecting voltage $V_C$ across the resistor 32 and thus between the output terminals 33*a* and 33*b* (terminal 33*a*** being at the higher potential).

In addition, the pulses 40 developed across the winding **23*b* are converted into a voltage of parabolic wave form by means of the inductor 27 and capacitor 28 which, as utilized therein, will function in the nature of a double-integrating circuit 26. This voltage of parabolic wave form is a horizontal dynamic convergence voltage $V_C'$ which is also available, through capacitor 31, between the respective circuit terminals 33*a* and 33*b*. As a result, the respective static and dynamic convergence voltages $V_C$ and $V_C'$ are superimposed upon each other to result in a net output voltage $(V_C+V_C')$ between the circuit terminals 33*a* and 33*b*. FIG. 2B shows the voltage $(V_C+V_C')$ between circuit terminals 33*a* and 33*b*, wherein the magnitude of the static voltage $V_C$ is indicated by a dotted line 41, and variation resulting from the parabolic waveform of the dynamic voltage $V_C'$ by a solid line 42. The function of the dynamic convergence voltage $V_C'$ is to vary the degree of convergence imposed upon the beams $B_B$ and $B_R$ according to the differing requirements of the periodically varying horizontal deflection conditions as the three beams are swept horizontally in the usual manner. The technique of deriving the voltage $V_C'$ from the flyback transformer 21** insures synchronism between $V_C'$ and the horizontal sweep.

Referring again to the fly-back transformer 21 it may be noted that the high voltage secondary winding 13 thereof is coupled to the anode of a high voltage rectifier circuit 22, the output side **22*a* of which is connected to the terminal 33*b* of the circuit 24 to apply the high output voltage $V_Q$ of rectifier 22 to terminal 33*b*. A terminal 34 is provided for the spaced, deflecting plates Q and Q′ and is connected as shown to the terminal 33*b* to receive the high voltage $V_Q$. A terminal 35, commonly referred to as the "anode button," is tied to each of the electrodes $G_3$ and $G_5$, and the shielding plates P and P′ and is connected as shown to the terminal 33*a* of the circuit 24. The terminal 35 is also connected to the graphite coating on the cathode ray tube cone portion, mentioned previously. As a result, the voltage appearing at the terminal 35** will be applied to each of the electrodes $G_3$ and $G_5$, the shielding plates P and P′, and as an anode voltage to the color phosphor screen S.

With the convergence voltage generating circuit 24 described, the voltage $V_Q$ appearing at the output side of the rectifier circuit 22, and thus at terminal 34, is applied to the deflecting plates Q and Q′. The anode voltage $V_P$, which is equal to $V_Q+(V_C+V_C')$, will appear at circuit terminal **33*a*, and thus terminal 35, and will be applied to the electrodes $G_3$ and $G_5$, the shielding plates P and P′, and the color phosphor screen S. As a result, the convergence deflection voltage, which is equal to $(V_C+V_C')$ is applied between the plates P and Q and between the plates P′ and Q′, the potential at the outer plates Q and Q′ being negative with respect to that at the inner plates P and P′. The magnitude of the static convergence voltage $V_C$ and the amplitude of the dynamic convergence voltage $V_C'$ are adjusted by means of the circuit 25**. In practice, the magnitude of the voltage $V_C$ is adjusted within a range of 200 to 350 v. and the amplitude of the voltage $V_C'$ within a range of 30 to 60 v. By means of the circuit described, the adjusted static convergence voltage $V_C$ is applied to the convergence means F of the ilustrated single-gun, three-beam type color picture tube so as to provide for proper convergence of the respective electron beams $B_B$, $B_G$ and $B_R$ at the common spot of the screen grid $G_P$, which results in proper aiming of the beams toward the respective color phosphor stripes $S_R$, $S_G$ and $S_B$. In addition, the adjusted horizontal dynamic convergence deflecting voltage $V_C'$ will be simultaneously applied to the deflecting means F so that the net voltage $V_C+V_C'$ results in a substantially distortion-free color picture which is virtually free from misconvergence.

With the system of FIG. 1, any tendency toward misconvergence is tuned out by the adjustment of the circuit 25. It is to be noted here that no high voltage is imparted to the adjusting circuit 25 since the latter is on the primary side of the transformer 23, so that no danger is presented to a service man manually adjusting the circuit 25. Furthermore, the breakdown voltage of each circuit element in the circuit 25 may be low, and no special care needs to be taken in insulating the circuit elements. If the transformer 23 were omitted and the winding 14 were coupled directly to the secondary side of the transformer 23 through the adjusting circuit 25, then high voltage $V_Q$ would be imparted to the circuit 25 so that it would be dangerous to perform a manual adjustment. In addition, the requirements as to the breakdown voltage of each element of the circuit 25 would be quite stringent. If the adjusting circuit 25 were connected to the secondary side of the transformer 23, similar problems would arise.

A further advantage of the circuit of FIG. 1 resides in the fact that the number of turns of the high voltage secondary winding 13 of the fly-back transformer 21 can be reduced by the number of turns required for the generation of the convergence deflecting voltage because the output voltage of the rectifier 22 connected to the winding 13 need only be $V_Q$ which is less than $V_P$ by the amount of the convergence voltage $V_C$ plus $V_C'$. In addition, the breakdown voltage requirements of the rectifier circuit 22 can be reduced to $V_Q$.

Although it might be thought that inclusion of the dynamic convergence voltage $V_C'$ in the anode voltage $V_P$ might give rise to adverse color tube operating effects, in practice this is not the case because the dynamic convergence voltage $V_C'$ has a value of 30 to 60 v. or less, which is negligibly small when compared with the anode voltage $V_P$ ranging from 13 to 20 kv.

The circuit of FIG. 1 will be recognized as one which inherently compensates for the effects of changes in the anode voltage $V_P$ which occur when the brightness of the picture is varied. Under such cimcumstances, if the ratio of $V_P$ to $V_C$ were allowed to vary, misconvergence would result. But the $V_P/V_C$ ratio is maintained substantially constant when the brightness is varied, owing to a negative feedback effect. Specifically, changes in anode voltage $V_P$ produce corresponding changes in anode current, and the latter current flows through the capacitors 31 and 28 in a direction which produces a change in $V_C$ to match the original change in $V_P$.

Figure 3A:
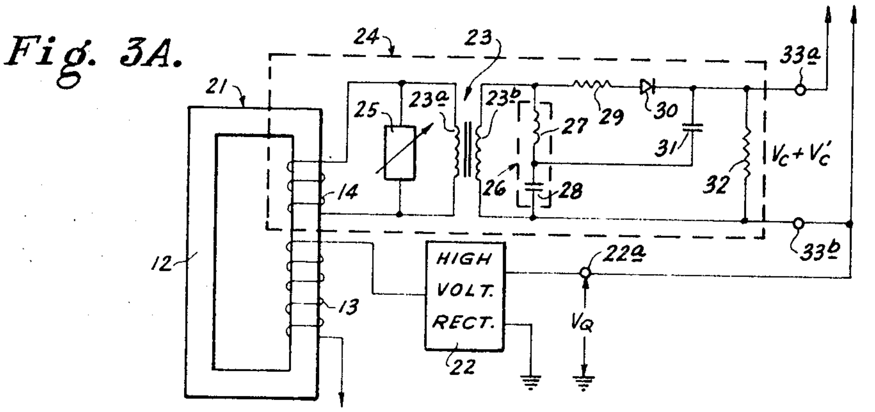
FIGS. 3A, B and C are circuit diagrams showing respective modifications to the convergence voltage generating means of the present invention.

Referring to FIG. 3A, there is shown a modification to the convergence voltage generating means 24 incorporated in the system of FIG. 1. In FIG. 1 the adjusting circuit 25 is connected in series with the primary winding **23*a* of the transformer 23, while in FIG. 3A the circuit 25 is connected in parallel with the winding 23*a***. Except for such difference, the arrangement of FIG. 3A is similar to that of FIG. 1. Therefore, parts of FIG. 3A corresponding to those of FIG. 1 are indicated by like reference numerals, and detailed description thereof will be omitted. It will be readily apparent to those skilled in the art, however, that the operation of the FIG. 3A circuit is similar to that described above in connection with FIG. 1.

Figure 3B:
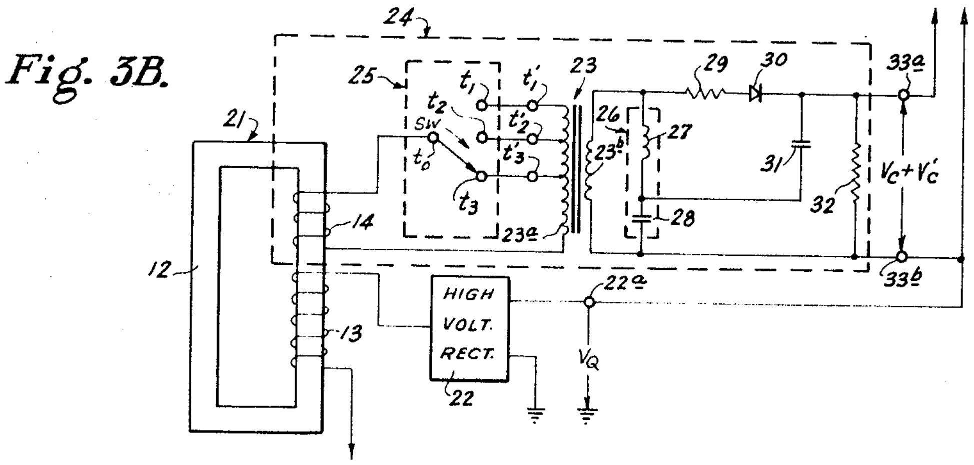

FIG. 3B shows another modification to the means 24 of FIG. 1. The arrangement of FIG. 3B is similar to that of FIG. 1, except that the adjusting circuit 25 comprises a switch SW consisting of a movable contact $t_0$ and a plurality of fixed contacts $t_1$, $t_2$, . . . associated therewith. A plurality of taps $t_1'$, $t_2'$, . . . provided on the primary winding 23*a* of the transformer 23 are connected to the fixed contacts $t_1$, $t_2$, . . . respectively, the winding 14 is connected to one end of the primary winding 23*a*, and the other end of the winding 14 is connected to movable contact $t_0$. Parts of FIG. 3B corresponding to those of FIG. 1 are indicated by like reference numerals, and detailed description thereof will be omitted. It will be understood that circuit operation is similar.

Figure 3C:
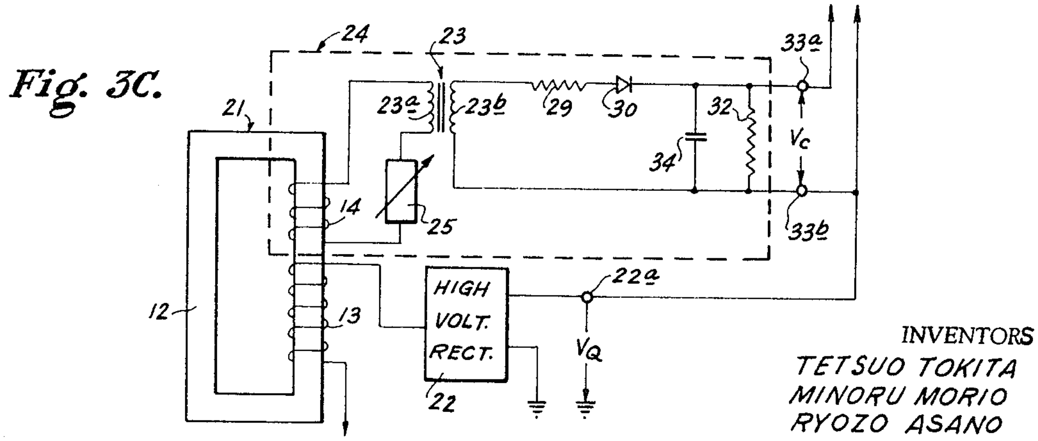

In the convergence voltage generating means shown in FIGS. 1, 3A and 3B, static and horizontal dynamic convergence voltages are both obtained between the terminals 33*a* and 33*b*, but it is also possible for the present invention to be embodied in a circuit of the kind shown in FIG. 3C. The latter is similar to FIG. 1 except that the inductor 27 of FIG. 1 is omitted, and a single capacitor indicated at 34 is substituted for the capacitors 31 and 28. In this arrangement, only the static convergence voltage $V_C$ is obtained between the terminals 33*a* and 33*b*, and it is adjusted by the adjusting circuit 25 so that a static convergence effect is produced.

The convergence deflecting voltage generating circuit 24 is not limited to the specific arrangements thereof depicted in FIGS. 1 and 3A to 3C, but rather, it is believed apparent that many modifications and changes in the respective circuit elements and/or the respective manners of connection thereof are possible. Thus it is believed apparent that many modifications and variations, other than those described hereinabove, may be effected in the disclosed embodiments of this invention without departing from the spirit and scope thereof as defined by the appended claims.

What is claimed is:

1. In a circuit including a color picture tube of the type generating a plurality of electron beams representing different color signals and at least two of which are divergent after focussing thereof and being provided with a pair of electrodes for each of said divergent beams to deflect said beams for convergence toward a common spot when a convergence deflection voltage is applied across said electrodes of each pair and with means within said tube requiring the application of an anode voltage thereto, means for providing a relatively high voltage to one of said electrodes of each pair, circuit means for generating said convergence deflection voltage across an ouput thereof, one side of said output being connected to said relatively high voltage and the other side of said output being connected to the other of said electrodes of each pair so as to apply thereto a voltage which differs from said high voltage by said convergence deflection voltage, said anode voltage requiring means being connected to the side of said output which is at the higher potential, and a source for energizing said convergence deflection voltage generating circuit means; the improvement comprising:

means connected between said source and said output for providing isolation from said high voltage;

and adjustable means connected between said source and said isolating means to permit safe manual adjustment of the convergence deflection voltage generated by said circuit means.

2. A circuit as in claim 1 wherein said source provides A.C. energy and said isolating means is a transformer.

3. A circuit as in claim 2 wherein said adjustable means is an adjustable impedance in the primary circuit of said isolating transformer.

4. A circuit as in claim 3 wherein said adjustable impedance is in series with said A.C. source and said isolating transformer primary.

5. A circuit as in claim 3 wherein said isolating transformer primary is in series with said A.C. source, and said adjustable impedance is shunted across said primary.

6. A circuit as in claim 2 wherein said isolating transformer primary has a plurality of taps, and said adjustable means is a switch connected for selection of a desired one of said taps to be connected to said A.C. source for energizing a selected portion of said primary.

7. A circuit as in claim 2 further comprising:

a flyback transformer to provide horizontal sweep deflection voltage for said picture tube;

said A.C. source being a low voltage secondary winding of said flyback transformer, whereby the voltage output required from said flyback transformer low voltage secondary winding is reduced by the voltage step-up provided by said isolating transformer.

8. A circuit as in claim 7 wherein said convergence deflection voltage generating circuit means further comprises:

a rectifying circuit connected to the secondary of said isolating transformer to provide at said other side of the output a static convergence deflection voltage superimposed upon said relatively high voltage.

9. A circuit as in claim 8 wherein said convergence deflection voltage generating circuit means further comprises:

means connected to said isolating transformer secondary to provide a dynamic convergence deflection voltage synchronized with the flyback transformer output and superimposed upon said static convergence deflection voltage and said relatively high voltage.

10. A circuit as in claim 9 wherein said dynamic convergence deflection voltage circuit is a double integrating circuit comprising a series combination of an inductor and capacitor, said series combination being shunted across the secondary of said isolating transformer.

11. A circuit as in claim 7 wherein said relatively high voltage providing means comprises:

a high voltage secondary winding of said flyback transformer;

and a high voltage rectifier circuit connected to be energized by said high voltage secondary winding and having an output which is connected both to said one electrode of each pair and to said one side of the ouptut of said convergence deflection voltage generating circuit means.

References Cited

UNITED STATES PATENTS

| | | | |
|---|---|---|---|
| 2,679,614 | 5/1954 | Friend | 315—13 |
| 2,716,718 | 8/1955 | Sonnenfeldt | 315—13 X |

RODNEY D. BENNETT, Jr., *Primary Examiner.*

M. F. HUBLER, *Assistant Examiner.*